United States Patent [19]
Dulany et al.

[11] Patent Number: 5,256,727
[45] Date of Patent: Oct. 26, 1993

[54] RESINS WITH REDUCED EPICHLOROHYDRIN HYDROLYZATES

[75] Inventors: Margaret A. Dulany; Clay E. Ringold, both of Decatur, Ga.

[73] Assignee: Georgia-Pacific Resins, Inc., Atlanta, Ga.

[21] Appl. No.: 876,621

[22] Filed: Apr. 30, 1992

[51] Int. Cl.$^5$ .......................... C08J 3/03; C08L 77/06
[52] U.S. Cl. .................................... 524/608; 523/414
[58] Field of Search ....................... 524/608; 523/414

[56] References Cited

U.S. PATENT DOCUMENTS

| | | |
|---|---|---|
| 2,926,116 | 2/1960 | Keim . |
| 2,926,154 | 2/1960 | Keim . |
| 3,053,782 | 9/1962 | Shelby . |
| 3,197,427 | 7/1965 | Schmalz . |
| 3,224,990 | 12/1965 | Babcock . |
| 3,240,664 | 3/1966 | Earle . |
| 3,240,761 | 3/1966 | Keim . |
| 3,259,600 | 1/1966 | Coscia . |
| 3,311,594 | 3/1967 | Earle . |
| 3,332,901 | 7/1967 | Keim . |
| 3,352,833 | 11/1967 | Earle . |
| 3,442,754 | 5/1969 | Espy . |
| 3,640,840 | 2/1972 | Zieman et al. . |
| 3,645,954 | 2/1972 | Terada et al. . |
| 3,700,623 | 10/1972 | Keim . |
| 3,733,290 | 5/1973 | Williams et al. . |
| 4,474,944 | 10/1984 | Yasuda et al. ................. 528/408 |
| 5,019,606 | 5/1991 | Marten et al. ................. 523/414 |

OTHER PUBLICATIONS

Heywood et al., "The Reaction of Epichlorohydrin with Secondary Amines", [Union Carbide Chemicals Co.], pp. 1257-1259, Mar. 5, 1958.

Fieser et al., "Reagents for Organic Synthesis", Wiley-Interscience, V. 3, pp. 119-120.

Devore et al., "Reduction of Total Organic Chloride Contaminants in Polyaminoamide-Epichlorohydrin Wet Strength Resins", 1991 Papermakers Conference, pp. 377-390.

Primary Examiner—Melvyn I. Marquis
Assistant Examiner—D. Aylward
Attorney, Agent, or Firm—Banner, Birch, McKie & Beckett

[57] ABSTRACT

Polyamidoamine-epichlorohydrin resin solutions with less than 1500 ppm of epichlorohydrin hydrolyzates after acid stabilization are produced by contacting the resin solution with either (a) dibasic phosphate salts having the general formula $M_2HPO_4$ where M represents Na, K, or $NH_4$, or (b) a nucleophilic alkanolamine at a temperature of less than about 50° C. for a time sufficient to produce a product solution having, after stabilization with acid, less than 1500 ppm of epichlorohydrin hydrolyzates.

17 Claims, No Drawings

RESINS WITH REDUCED EPICHLOROHYDRIN HYDROLYZATES

FIELD OF THE INVENTION

The invention relates to a process for making polyamidoamine epichlorohydrin resin products having a low level of residual epichlorohydrin hydrolyzates.

DESCRIPTION OF RELATED TECHNOLOGY

Polyamidoamine epichlorohydrin resin products exhibiting thermoset properties are useful for increasing the wet strength of papers and reducing paper "creep" while the paper is wet. As such, these resin products are in wide use and in contact with consumers on a daily basis.

Polyamidoamine epichlorohydrin resins can be made by the reaction of epichlorohydrin with a polyamidoamine under basic conditions (i.e., a pH between about 7 to about 11). The resulting resin is then contacted with an acid to stabilize the product. See, U.S. Pat. Nos. 3,311,594 and 3,442,754. Any unreacted epichlorohydrin in the product is hydrolyzed by the acid to, inter alia, 1,3-dichloro-2-propanol (1,3-DCP), 3-chloro-1,2-propanediol (CPD), and 2,3-dichloro-1-propanol (2,3-DCP). The 1,3-DCP product is the predominant hydrolysis product with CPD being formed in levels of about 10% of the 1,3-DCP and 2,3-DCP being formed in levels of about 1% of the 1,3-DCP. Although the final product will contain several other types of organic chlorines (as measured by the difference between inorganic chloride and total chlorine concentrations), the 1,3-DCP and CPD concentrations can be accurately determined by $C^{13}$ NMR and GC-MS measuring techniques known in the art. The 2,3-DCP concentrations are, however, generally below the detection limit of $C^{13}$ NMR so 1,3-DCP and CPD are generally used as measurements for the epichlorohydrin hydrolysis products present in the resin.

Epichlorohydrin has recently been classified as a potential human carcinogen and there is some concern that the hydrolysis products therefrom may pose similar health concerns. There is also some indication that the organic chloride hydrolyzates contribute to adsorbable organic halide contamination of effluent waters. It is, therefore, desirable to develop wet strength resins having low levels of epichlorohydrin and its hydrolysis products. There is some indication, though that elimination of all hydrolyzates may adversely affect product performance because hydrolyzates contribute to the ability of the resin product to provide wet strength for paper products. See, column 2 of U.S. Pat. No. 4,853,431.

A number of recent publications address the problems of residual hydrolyzates for polyamidoamine epichlorohydrin resin products.

U.S. Pat. No. 4,975,499 describes an object of the invention as producing a crosslinkable polyamidoamine resin comparable to the conventional epichlorohydrin resins in wet strength effect but with less organically bound halogen. The manufacturing process includes the reaction of dicarboxylic acid with particular polyamines to make the polyamidoamine which is then reacted with the epichlorohydrin and a base at a pH of 8-14 and a temperature of 15°-95° C. Useful bases include lithium hydroxide, alkaline earth hydroxides, ammonia, sodium or potassium carbonate, and sodium or potassium phosphate. Halogen-free acids are then added to end the reaction and stabilize the solution. The examples report resins having organic chloride contents within the range of 0.11-0.16% (1100-1600 ppm).

U.S. Pat. No. 5,017,642 describes the formation of polyamidoamine-epichlorohydrin resins having low levels of organic chloride compounds. The manufacturing process involves control over the molar ratio of epihalohydrin to the secondary amine of the polyamidoamine. At reaction temperatures within the range of 10°-45° C., this molar ratio is 0.85-1.4. At temperatures in the range of 45°-55° C., the ratio is 0.85-1.25. A holding step at 25°-70° C. is used until the viscosity of a 15% solution falls within the range of 10-100 cps. Thereafter, acid is added to stabilize the polymer. The resins of the examples have dichlorohydrin concentrations within the range from 100 ppm to 16,800 ppm. Total organic chloride concentrations were not reported.

U.S. Pat. No. 5,019,606 also relates to the manufacture of polyamidoamines to produce resins having less than 4% of organically bound chlorine. The process involves reacting the polyamidoamine with epichlorohydrin in the ratio of 0.6-2 moles epichlorohydrin per mole of basic amino groups in the polyamidoamine. The resin solution is then reacted with 0.1-1 mole of base per mole of epichlorohydrin at 25°-95° C. (preferably 40°-70° C.) and a pH of greater than 8 (preferably between 9-12). The solution is then re-acidified by the addition of acid to a pH of 7 or less (preferably 1.5-5). The bases disclosed as useful for the treatment are alkali metal hydroxides, alkaline earth metal hydroxides, carbonates, bicarbonates, benzyltrimethylammonium hydroxide, tetramethylammonium hydroxide, tetraethylammonium hydroxide, and mixtures thereof.

One method for controlling the epichlorohydrin residue concentrations is to control the reactant ratios during the process of making the resin. Reducing the amount of unreacted epichlorohydrin is useful to some extent because unreacted epichlorohydrin in the resin will hydrolyze when the stabilization acid is added to the resin and increase the 1,3-DCP and CPD levels in the product. Manufacturing controls can only go so far, however, toward solving the problem of epichlorohydrin hydrolyzates in the final, stabilized resin product. Hydrolyzates continue to be formed inherently during the polyamidoamine/epichlorohydrin polymerization reaction.

There exists a humanitarian and commercial need for a process for reducing the amount of epichlorohydrin hydrolyzate materials in existing polyamidoamine epichlorohydrin resin products as well as future products. It would also be desirable to have a process for reducing the total amount of organic chlorine in the resin products as a safeguard that such materials might be later found to pose an environmental or health risk. Preferably, such a process would not substantially affect the efficacy of the resin product in providing wet strength to paper or creping.

SUMMARY OF THE INVENTION

It is an object of the invention to provide a process for making acid-stabilized polyamidoamine epichlorohydrin resin products that exhibit low levels, e.g., less than about 1500 ppm, of 1,3-DCP and CPD.

It is also an object of the invention to provide a process for reducing the total amount of organic chlorine in acid-stabilized polyamidoamine epichlorohydrin resin products.

In accordance with these and other objectives of the invention that will become apparent from the description contained herein, processes according to the invention comprise:

contacting an aqueous solution comprising polyamide-epichlorohydrin resin and greater than 1500 ppm of epichlorohydrin and its hydrolyzates with a nucleophile selected from the group consisting of: (a) dibasic phosphate salts having the general formula $M_2HPO_4$ where M represents Na, K, or $NH_4$; and (b) a nucleophilic alkanolamine, wherein the contacting occurs in a reaction solution having a pH within the range from about 8 to less than 11 at a temperature of less than about 50° C. and for a time sufficient that, after contact with a stabilizing amount of an acid, the resin product has less than 1500 ppm of 1,3-dichloro-2-propanol and 3-chloro-1,2-propanediol. Preferably, this reduction in 1,3-DCP and CPD will be accompanied by a reduction of at least 60% in the amount of organic chlorine in the stabilized product compared to the resin solution before contact with the nucleophile.

The process may be used for resins that have been previously stabilized with acid by adding a base, treating the resin, and then adding additional acid to stabilize the resin. Alternatively, the treatment may be integrated into a continuous resin manufacturing process to include contact with nucleophiles according to the invention after resin formation but before any stabilization acid has been employed. Processes of the invention provide resin products that exhibit significantly lower amounts of 1,3-DCP, CPD, and organic chlorine than those of previous processes without significant sacrifice in the ability of the product to impart wet strength to paper products.

DETAILED DESCRIPTION

The invention involves contacting polyamidoamine epichlorohydrin resin products containing unreacted epichlorohydrin and epichlorohydrin hydrolyzates with a nucleophilic agent under controlled pH and temperature to preferentially attack the epichlorohydrin and its hydrolyzates without gelling the resin or denaturing the product polymer. The nucleophile displaces the chloride on the epichlorohydrin and hydrolyzate molecules and removes them from the acid-base equilibrium process without changing the polyamidoamine epichlorohydrin polymer or significantly affecting its ability to provide wet strength in paper.

Processes for making polyamidoamine-epichlorohydrin resins are well known from, inter alia, U.S. Pat. Nos. 2,926,154, 4,853,431, and 5,019,606 which are herein incorporated by reference. Briefly described, these processes occur in two steps: the first step comprises forming a polyamide by reacting a dicarboxylic acid, dicarboxylic acid halide, or diester with a polyalkylene polyamine at a temperature within the range of 40°-250° C. The polyamide is then reacted with epichlorohydrin under basic conditions and a temperature within the range of 45°-100° C. for 3-6 hours to form an aqueous solution of the polyamidoamine epichlorohydrin resin at a solids concentration within the range of about 5-40%. The final product is made by adding at least one acid that will change the pH generally to within the range of about 3 to less than 6.

Epichlorohydrin polyamidoamine resin product solutions are typically made acidic to provide long term storage stability to the solution. Preferred acids for stabilization include sulfuric acid, formic acid, nitric acid, acetic acid, phosphoric acid, hydrochloric acid, phosphoric acid, phosphorous acid, and hypophosphorous acids.

The resin products that can be treated in the present invention may be in the form of an existing acid-stabilized product or may represent a basic resin solution before acid stabilization. If in the form of an acid-stabilized resin product, the product must be neutralized by the addition of a strong base to make the resin solution reactive. Resin solutions that are already basic or neutral need no further treatment to be used in the present process. The present process is well suited as an auxiliary step in conventional polyamidoamine epichlorohydrin resin manufacture just before the stabilization acid is conventionally added to the resin solution.

Nucleophilic bases suitable for removing epichlorohydrin hydrolyzates include: (a) dibasic phosphate salts having the general formula $M_2HPO_4$ where M is Na, K, or $NH_4$; and (b) alkanolamines having one to eight carbon atoms, preferably two to six carbon atoms. Alkanolamines useful for the present process preferably have low volatility to avoid noxious odors and volatile organic emissions in the final product although volatile nucleophilic alkanolamines can be used if odors are not a problem or can be removed prior to use. Preferred nonvolatile alkanolamines include monoethanolamine, diethanolamine, triethanolamine, 2-dimethylaminoethanol, and aminopropyl diethanolamine. Diethanolamine is the most preferred nucleophilic base for use in the present process.

The nucleophilic base concentration used in the present process should be selected to avoid gelation (at lower concentrations) to an economically useful level for the amount of epichlorohydrin and hydrolyzate remaining in the product. Generally, the number of moles of nucleophilic base concentration is selected to be approximately the same as the combined number of moles of epichlorohydrin (if any is present) and its hydrolyzates in the polyamidoamine epichlorohydrin resin being treated, i.e., about a 1:1 molar ratio of nucleophile to epichlorohydrin plus hydrolyzates. If the molar concentrations are converted to weight ratios, useful nucleophilic base concentrations are usually within the range from about 0.1% to about 5%, preferably 0.75% to about 2%, and more preferably 1-2% by weight based on the weight of the epichlorohydrin polyamidoamine resin solution.

Removal of hydrolyzates with a nucleophilic amine or dibasic salt should not be confused with merely adding a base to shift equilibrium concentrations, e.g., NaOH merely shifts the dichloropropanol/epichlorohydrin equilibrium. Suitable nucleophilic amines according to the invention remove organic chlorines from the reaction.

The pH, temperature, and time for the nucleophile contacting step are chosen to reduce the organic chlorine levels in the acid-stabilized product by at least 60%, preferably at least 70%, and even more preferably at least 80%. These reduction levels should coincide with a final level of 1,3-DCP and CPD in the acid-stabilized product that is less than 1500 ppm, preferably less than 1250 ppm, and even more preferably less than 1000 ppm.

The pH of the combined polyamidoamine epichlorohydrin resin and nucleophilic alkanolamine should be maintained within the range from about 8 to about 11, preferably within the range from about 9.5 to less than 11, and most preferably within the range from about 10 to about 10.5. Operating below the suggested range can be performed although the reaction between the epichlorohydrin hydrolyzate and the alkanolamine may be slower than economic for many manufacturing facilities. Operating at a pH of higher than about 11 can denature the polymer. The basic pH of the solution is maintained by adding a base as needed. Suitable bases for controlling the solution pH include sodium hydroxide, potassium hydroxide, and sodium carbonate.

The temperature of the combined polyamidoamine epichlorohydrin resin and nucleophile should be maintained at less than 50° C. to avoid denaturing the polymer and above about 20° C. to avoid long reaction times. Preferred temperatures of the resin-nucleophile solution is within the range from about 20° C. to about 40° C. Most preferred temperatures are within the range from about 25°-30° C.

The epichlorohydrin polyamidoamine resin should be allowed to react with the nucleophile for as long as necessary to reduce the epichlorohydrin hydrolyzate and organic chlorine concentrations to as low as possible in the acid-stabilized product. Generally, a contacting time within the range from about 4 to about 8 hours will be sufficient depending on the alkanolamine, pH, and contact temperature although longer periods may be used if necessary. With the preferred embodiment of the invention, a contact time of about 6 hours is usually sufficient.

The 1,3-DCP and CPD concentrations in the acid-stabilized resin are conveniently determined using the known technique of $C^{13}$ NMR with a dimethyl sulfoxide (DMSO) calibration standard. The ratio of 1,3-dichloropropanol to DMSO is linear with respect to the DMSO concentration and can be used to generate a calibration curve to the hydrolyzate concentration for the particular measuring apparatus. The concentration of 2,3-DCP is generally below the detection limits of $C^{13}$ NMR and does not generally enter into the measurement of hydrolyzate concentration in the acid-stabilized product. The $C^{13}$ NMR method is non-invasive and does not rely on extraction—a method which can affect the accuracy of a concentration analysis because the epichlorohydrin/hydrolyzate equilibrium shifts during the extraction process.

EXAMPLES

EXAMPLE 1

To 3502.9 g of a commercially available epichlorohydrin polyamidoamine resin solution (22%) containing about 0.80% total organic chlorine and 0.62% of 1,3-DCP and CPD combined at a pH of about 7 was added 66.12 g of an 85% solution of diethanolamine. The pH of the reaction mixture was held constant at 9.3 for four hours by the intermittent addition of a 50% NaOH solution. The temperature was held constant at 35° C. The pH was then adjusted to 3.0 by the addition of 134.9 g of 35% aqueous sulfuric acid. The solids content of the resin solution was adjusted to 12.5% by the addition of 766.7 g of water. The product resin exhibited about 0.15% of total organic chlorine and 0.07% of the combined weights of 1,3-DCP and CPD based on the weight of the resin solids.

Organic chlorine was reduced by about 81% and the epichlorohydrin hydrolyzate concentration was reduced by about 89%.

EXAMPLE 2

To 500 g of a commercially available epichlorohydrin polyamidoamine resin solution (25%) containing about 1.77% total organic chlorine and 2.1% of 1,3-DCP and CPD combined at a pH of about 7 was added 13.75 g of diethanolamine. The system pH was maintained within the range of 9.1 to 9.3 by the addition of 50% NaOH for seven hours. Sulfuric acid was added in an amount sufficient to reduce the solution pH to 3.15. The acid-stabilized resin solution exhibited an organic chlorine content of 0.70% and 0.35% of the combined weights of 1,3-DCP and CPD based on the weight of the resin solids.

Organic chlorine was reduced by about 60.5% and the epichlorohydrin hydrolyzate concentration was reduced by about 83%.

EXAMPLE 3

Example 2 was repeated except that: (a) the starting organic chloride content was 1.80% and the combined weights of 1,3-DCP and CPD were 3.3%; (b) the pH was maintained within the range of 9.3 to 9.5; and (c) and the contacting was permitted for only 6 hours. Sulfuric acid was added in an amount sufficient to reduce the solution pH to 3.08. The final organic chlorine content was 0.57% and the combined weights of 1,3-DCP and CPD were 1%.

Organic chlorine was reduced by about 68% and the epichlorohydrin hydrolyzate concentration was reduced by about 70%.

EXAMPLES 4-9

Examples 4-9 followed the same fundamental procedure as examples 1-3 using a 12.5-13% solids epichlorohydrin polyamidoamine resin solution. The final organic chlorine content (RCl) was measured after addition of a stabilizing amount of sulfuric acid (ex. 4-8) or phosphoric acid (ex. 9).

| Example | Nucleophile | pH | Duration | RCl % (start) | RCl % (end) | % drop |
|---|---|---|---|---|---|---|
| 4 | DEA | 9.1-9.7 | 3 hrs 40 mins. | about 0.80% | 0.20 | 75% |
| 5 | TEA | 9.2-9.5 | 4 hrs 10 mins. | about 0.80% | 0.25 | 69% |
| 6 | MEA | 9.2-9.5 | 3 hrs 37 mins. | about 0.80% | 0.19 | 76% |
| 7 | APDEA | 9.2-9.5 | 3 hrs | about 0.80% | 0.21 | 74% |
| 8 | DEA | 9.2-9.5 | 4 hrs | about 0.80% | 0.22 | 73% |
| 9 | DEA | 9.2-9.5 | 4 hrs | about 0.80% | 0.20 | 75% |

DEA = diethanolamine
TEA = triethanolamine
MEA = monoethanolamine
APDEA = aminopropyl diethanolamine

EXAMPLE 10

Nucleophilic amines were compared with nucleophilic dibasic phosphate salts for their effects on reducing the organic chlorine contents in 50 g off a conventional epichlorohydrin polyamidoamine resins having 12.5% solids. The solution was held at 25° C. and replicate samples were made at a pH of 8 and a pH of 10 adding sulfuric acid or sodium hydroxide as needed to overcome the initial buffering effects of the nucleophiles although the amount of each nucleophile used at the pH of 8 was the same as the amount used at a pH of 10. The pH of each solution was not otherwise controlled during the reaction. The treatment was allowed to continue for about 16 hours before adding stabilizing amounts of 35% sulfuric acid.

| Ex. | Nucleophile | pH | RCl % (start) | RCl % (end) | % Drop |
|---|---|---|---|---|---|
| 10 | TEA | 8 | 0.80 | 0.69 | 14 |
| 11 | TEA | 10 | 0.80 | 0.43 | 46 |
| 12 | K$_2$HPO$_4$ | 8 | 0.80 | 0.60 | 25 |
| 13 | K$_2$HPO$_4$ | 10 | 0.80 | 0.26 | 68 |
| 14 | (NH$_4$)$_2$HPO$_4$ | 8 | 0.80 | 0.65 | 19 |
| 15 | (NH$_4$)$_2$HPO$_4$ | 10 | 0.80 | gel | — |
| 16 | DEA | 10 | 0.80 | 0.27 | 66 |

It should be noted that the ammonium phosphate of examples 14 and 15 did not perform as well as expected in the process. The reduced efficacy is thought to be related to the lack of control over the solution pH during the reaction of the dibasic phosphate salt with the organic chlorine compounds. Accurate control over the solution pH would reflect a different and more useful result.

We claim:

1. A process for preparing a polyamide-epichlorohydrin resin solution product exhibiting low levels of epichlorohydrin hydrolyzates, said process comprising:
    contacting an aqueous solution comprising epichlorohydrin polyamidoamine resin and greater than 1500 ppm combined weight of epichlorohydrin and its hydrolyzates with a nucleophile selected from the group consisting of (a) dibasic phosphate salts having the general formula M$_2$HPO$_4$ where M represents Na, K, or NH$_4$, and (b) a nucleophilic alkanolamine, wherein the contacting occurs in a reaction solution having a pH within the range from about 8 to about 11 at a temperature of less than about 50° C. for a time sufficient to produce a resin product solution which, after stabilization with a stabilizing amount of an acid, exhibits less than 1500 ppm of 1,3-dichloro-2-propanol and 3-chloro-1,2-propanediol.

2. A process as in claim 1 wherein the contacting step comprises:
    contacting said aqueous solution with a nucleophilic alkanolamine in an amount within the range of 0.1% to 5% based on the weight of said aqueous solution.

3. A process as in claim 1 wherein the contacting step comprises:
    contacting said aqueous solution with a nucleophilic alkanolamine having one to eight carbon atoms.

4. A process as in claim 1 wherein the contacting step comprises:
    contacting said aqueous solution with a nucleophilic alkanolamine selected from the group consisting of monoethanolamine, diethanolamine, triethanolamine, aminopropyl diethanolamine, and 2-dimethylaminoethanol.

5. A process as in claim 1 wherein the contacting step comprises:
    contacting said aqueous solution with diethanolamine.

6. A process as in claim 1 wherein the contacting step further comprises:
    maintaining the pH of said reaction solution within the range from about 9.5 to less than 11 by adding a base.

7. A process as in claim 1 wherein the contacting step further comprises:
    maintaining the pH of said reaction solution at a pH within the range from about 10 to about 10.5.

8. A process as in claim 1 wherein the contacting step comprises:
    contacting said aqueous solution with said nucleophile at a temperature within the range from about 20° C. to about 50° C.

9. A process as in claim 8 wherein the contacting step comprises:
    contacting said aqueous solution with said nucleophile at a temperature within the range from 25° C. to 35° C.

10. A process for preparing a polyamide-epichlorohydrin resin solution product exhibiting low levels of organic chlorine, said process comprising:
    contacting an aqueous solution comprising epichlorohydrin polyamidoamine resin and greater than 1500 ppm combined weight of organic chlorine with a nucleophile selected from the group consisting of (a) dibasic phosphate salts having the general formula M$_2$HPO$_4$ where M represents Na, K, or NH$_4$, and (b) a nucleophilic alkanolamine, wherein the contacting occurs in a reaction solution having a pH within the range from about 8 to about 11 at a temperature of less than about 50° C. and for a time sufficient to produce a resin product solution which, after stabilization with a stabilizing amount of an acid, exhibits at least 60% less organic chlorine than said aqueous solution before contact with said nucleophile.

11. A process as in claim 10 wherein the contacting step comprises:
    contacting said aqueous solution with a nucleophilic alkanolamine in a concentration within the range from 0.1% to 5% based on the weight of said aqueous solution.

12. A process as in claim 10 wherein the contacting step comprises:
    contacting said aqueous solution with a nucleophilic alkanolamine having one to eight carbon atoms.

13. A process as in claim 10 wherein the contacting step comprises:
    contacting said aqueous solution with a nucleophilic alkanolamine selected from the group consisting of monoethanolamine, diethanolamine, triethanolamine, aminopropyl diethanolamine, and 2-dimethylaminoethanol.

14. A process as in claim 10 wherein the contacting step comprises:
    contacting said aqueous solution with diethanolamine.

15. A process as in claim 10 wherein the contacting step further comprises:
    maintaining the pH of said reaction solution within the range from about 9.5 to less than 11 by adding a base.

16. A process as in claim 10 wherein the contacting step comprises:
    contacting said aqueous solution with said nucleophile at a temperature within the range from about 20° C. to about 50° C.

17. A process as in claim 16 wherein the contacting step comprises:
    contacting said aqueous solution with said nucleophile at a temperature within the range from 25° C. to 35° C.

* * * * *